United States Patent
Naskar et al.

(10) Patent No.: US 11,248,121 B2
(45) Date of Patent: Feb. 15, 2022

(54) LIGNIN-BASED POLYMERS WITH ENHANCED MELT EXTRUSION ABILITY

(71) Applicant: UT-Battelle, LLC, Oak Ridge, TN (US)

(72) Inventors: Amit K. Naskar, Knoxville, TN (US); Ngoc A. Nguyen, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 168 days.

(21) Appl. No.: 16/257,294

(22) Filed: Jan. 25, 2019

(65) Prior Publication Data

US 2019/0225808 A1 Jul. 25, 2019

Related U.S. Application Data

(60) Provisional application No. 62/621,705, filed on Jan. 25, 2018.

(51) Int. Cl.
| | |
|---|---|
| *C08L 97/00* | (2006.01) |
| *C08L 77/00* | (2006.01) |
| *B29C 64/118* | (2017.01) |
| *C08G 69/08* | (2006.01) |
| *C08L 77/02* | (2006.01) |
| *B33Y 70/00* | (2020.01) |
| *B29K 277/00* | (2006.01) |
| *C08L 77/06* | (2006.01) |

(52) U.S. Cl.
CPC .......... *C08L 97/005* (2013.01); *B29C 64/118* (2017.08); *C08G 69/08* (2013.01); *C08L 77/00* (2013.01); *C08L 77/02* (2013.01); *B29K 2093/00* (2013.01); *B29K 2277/00* (2013.01); *B33Y 70/00* (2014.12); *C08L 77/06* (2013.01)

(58) Field of Classification Search
CPC ........ C08L 77/02; C08L 77/00; C08L 97/005; C08L 77/06; B29C 64/118; C08G 69/08; C08K 7/06; C08K 3/046; B29K 2277/00; B29K 2093/00; B33Y 70/00
See application file for complete search history.

(56) References Cited

U.S. PATENT DOCUMENTS

| | | | |
|---|---|---|---|
| 4,988,469 A | 1/1991 | Reavely et al. | |
| 6,853,260 B1 | 2/2005 | Hajimiri et al. | |
| 9,296,876 B2 | 3/2016 | Jeol et al. | |
| 9,815,985 B2 | 11/2017 | Naskar et al. | |
| 2015/0368471 A1 | 12/2015 | Naskar | |
| 2016/0002467 A1* | 1/2016 | Erdmann | ................ C08L 77/06 524/76 |
| 2016/0347000 A1 | 12/2016 | Kerrigan | |
| 2018/0371253 A1 | 12/2018 | Naskar et al. | |

FOREIGN PATENT DOCUMENTS

WO 2004056699 A2 7/2004

OTHER PUBLICATIONS

International Search Report and Written Opinion dated Mar. 22, 2019 issued in PCT/US19/15087.
Liu Y. et al., "Crystalline Morphology and Polymorphic Phase Transitions in Electrospun Nylon 6 Nanofibers", Macromolecules, (2007), vol. 40, No. 17, pp. 6283-6290.
Dickson, A.N. et al., "Fabrication of continuous carbon, glass and Kevlar fibre reinforced polymer composites using additive manufacturing", Additive Manufacturing, (2017), vol. 16, pp. 146-152.
Nguyen, N.A., "A path for lignin valorization via additive manufacturing of high-performance sustainable composites with enhanced 3D printability", Science Advances 2018, Dec. 14, 2018, pp. 1-15, 4.

* cited by examiner

*Primary Examiner* — Angela C Scott
(74) *Attorney, Agent, or Firm* — Scully, Scott, Murphy & Presser, P.C.

(57) ABSTRACT

A solid polymer blend material comprising: (i) lignin; and (ii) a polyamide having a melting point of no more than 240° C. and which is below the decomposition temperature of the lignin; wherein said lignin is homogeneously dispersed in said polyamide. Methods for producing the blend material are also described. Methods for producing objects made of the blend material by melt extrusion are also described, comprising: (a) melt blending components (i) and (ii) to form a polymer blend in which components (i) and (ii) are homogeneously blended, wherein the polymer blend exhibits a melt viscosity of no more than 2000 Pa·s at a shear rate of 100-1000 $s^{-1}$ and when heated to a temperature of no more than 240° C.; and; (b) forming an object made of said polymer blend material.

29 Claims, 8 Drawing Sheets

LIGNIN-BASED POLYMERS WITH ENHANCED MELT EXTRUSION ABILITY

CROSS-REFERENCE TO RELATED APPLICATIONS

The present application claims benefit of U.S. Provisional Application No. 62/621,705 filed Jan. 25, 2018, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates generally to lignin compositions, and more particularly, to lignin compositions with melt extrusion ability.

BACKGROUND OF THE INVENTION

The fast growth of polymer 3D-printing technologies warrants the development of printable matter from sustainable feedstocks. The use of plant-based renewable resources in polymer products helps reduce human dependency on petroleum and lowers the carbon footprint associated with manufacturing. Lignin, a natural polymer, is a coproduct from paper mills and biorefineries and has, for decades, been considered a promising feedstock for renewable plastics.

However, lignin-based thermoplastics generally do not exhibit acceptable properties for melt extrusion and production (e.g., injection molding or additive manufacturing) of objects. Generally, lignin and its blends and copolymers possess an unacceptably high level of viscosity and a lack of melt stability in its molten state, and brittleness at room temperature. Moreover, particularly in the case of additive manufacturing via fused deposition modeling, while a good shear-thinning behavior permits good printability of a solid polymer, its room temperature stiffness should be capable of withstanding the normally high feeding rate of the filament without buckling. An increased temperature of the printing nozzle is typically not found to be viable since lignin will often become crosslinked, degrade, and char at elevated temperatures. Thus, there would be a significant benefit in a lignin-based material having an acceptably low melt viscosity and resistance to buckling during extrusion to more easily produce a host of objects in which lignin is incorporated.

SUMMARY OF THE INVENTION

The present disclosure is directed to lignin-containing solid polymer blend materials that advantageously possess reduced melt viscosities, reduced brittleness, and a substantial resistance to buckling of the solid filament strand during extrusion via fused deposition modeling. Thus, the blend materials described herein advantageously expand the use of lignin as a building material in methods in which melt extrusion is used. The present invention achieves this by forming a blend of the lignin with a polyamide (e.g., nylon) polymer having a melting point below the decomposition temperature of the lignin. More specifically, the polymer blend material contains the following components: (i) lignin; and (ii) a polyamide having a melting point of no more than 240° C. and which is below the decomposition temperature of the lignin; wherein the lignin is homogeneously dispersed in the polyamide.

In another aspect, the present disclosure is directed to methods for producing the polymer blend material and for producing objects therefrom. The method for producing objects from the polymer blend material generally involves the following steps: (a) melt blending the following components: (i) a lignin and (ii) a polyamide having a melting point of no more than 240° C. and which is below the decomposition temperature of the lignin, to form a polymer blend in which components (i) and (ii) are homogeneously blended, wherein the polymer blend exhibits a melt viscosity of no more than 2000 Pa·s at a shear rate of 100-1000 s$^{-1}$ and when heated to a temperature of no more than 240° C.; and; (b) forming an object made of the polymer blend material (e.g., by casting or extruding). In more specific embodiments, which may be particularly suited to an additive manufacturing (AM) method, the method for producing an object from the polymer blend material involves the following steps: (a) producing a solid polymer blend material comprising: (i) lignin and (ii) a polyamide having a melting point of no more than 240° C. and which is below the decomposition temperature of the lignin, wherein the lignin is homogeneously dispersed in said polyamide; (b) melting the solid polymer blend material by heating it to a temperature of no more than 240° C. to produce a melt of the solid polymer blend material, and subjecting the melt to a shear rate of 100-1000 s$^{-1}$ to result in the melt having a melt viscosity of no more than 2000 Pa·s; and (c) forming an object made of the polymer blend material (e.g., by depositing the melt layer by layer). By virtue of the special method used in producing these blend materials, the blend materials may contain high loadings of lignin, such as at least 50 wt % or higher.

BRIEF DESCRIPTION OF THE FIGURES

FIG. 1A shows results for HIPS and nylon 12; FIG. 1B shows results for HIPS and nylon 12 with 40 wt % HW lignin; FIG. 1C shows results for HIPS and nylon 12 with 50 wt % HW lignin; FIG. 1D shows results for HIPS and nylon 12 with 60 wt % HW lignin samples; and FIG. 1E shows results at a reference temperature of 230° C. of HIPS and HW-nylon 12 (40 wt % HW lignin) with different carbon fiber (CF) contents from 4 to 16 wt % CF.

FIG. 2A shows the measured 3-point bending storage modulus (G') as a function of frequency of selected compression molded samples at 25° C.: ABS, HIPS, nylon 12, nylon 12—HW lignin (40 wt. %) with different carbon fiber (CF) contents of 0, 4, 8, 12, and 16 wt. %. FIG. 2B shows the tensile Young's modulus of selected molded samples. FIG. 2C shows the tensile strength of selected molded samples.

DETAILED DESCRIPTION OF THE INVENTION

Figure 1A:
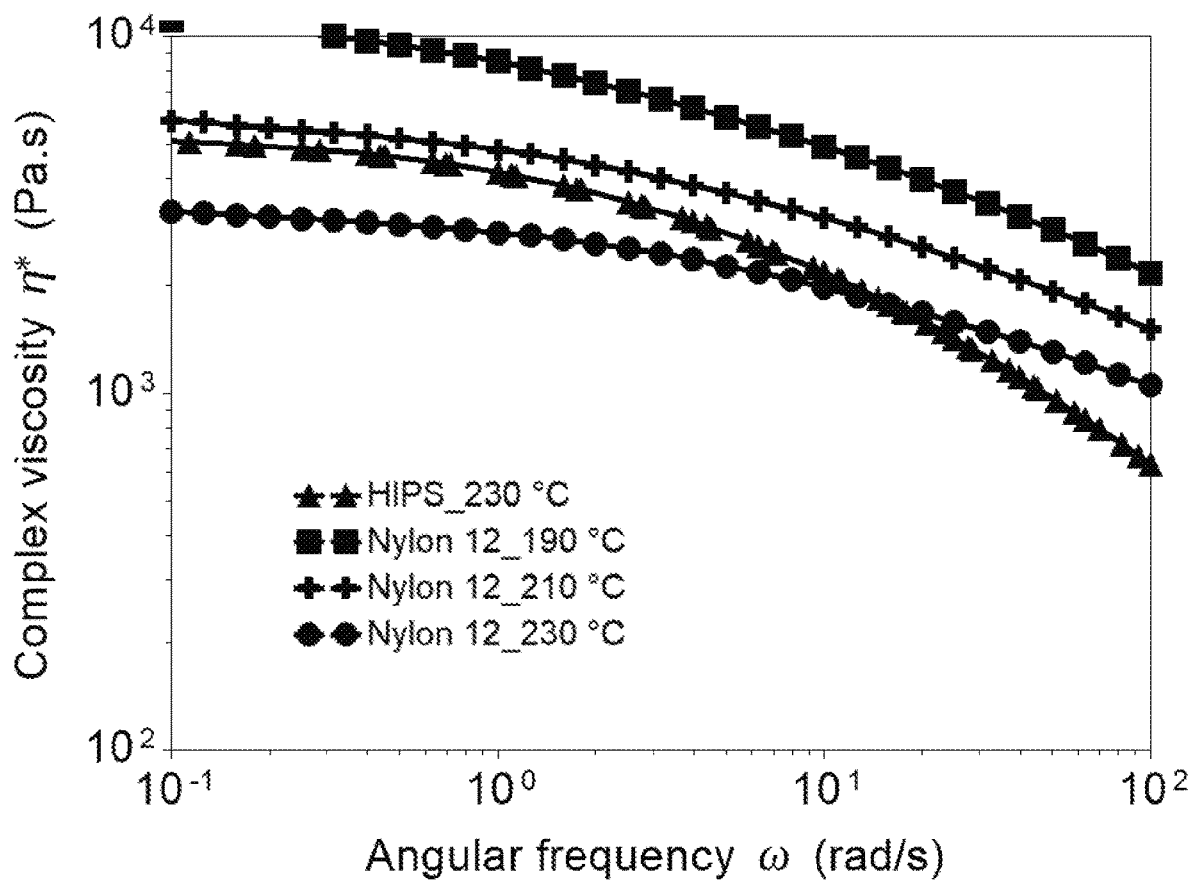
FIGS. 1A-1E are graphs showing complex viscosity of high impact polystyrene (HIPS), nylon, and its composites with different HW lignin contents.

In a first aspect, the instant disclosure is directed to a solid polymer blend material that includes: (i) lignin; and (ii) a polyamide having a melting point of no more than 240° C.

and which is below the decomposition temperature of the lignin, wherein the lignin is homogeneously dispersed in the polyamide. Typically, the polyamide has a higher melting point than the softening temperature of amorphous lignin. The terms "polymer blend" and "homogeneously dispersed," as used herein, refer to a solid solution in which discrete microscopic regions of components (i) and/or (ii) are present. The polymer blend may exhibit substantial integration (i.e., near homogeneous) at the microscale or approaching the molecular level, but without losing each component's identity. Generally, one of the components (i) or (ii) functions as a matrix in which domains (i.e., particles or microscopic regions) of the other component (i) or (ii) are dispersed. In particular embodiments of the polymer blend material, the polyamide component (ii) functions as a matrix in which the lignin component (i) is dispersed in the form of domains having any of the exemplary sizes provided hereinbelow. The domains generally have a size up to or less than 100 microns (100 μm). In different embodiments, the domains have a size up to or less than, for example, 50 μm, 10 μm, 5 μm (5000 nm), 2 μm (2000 nm), 1 μm (1000 nm), 800 nm, 500 nm, 200 nm, 100 nm, 50 nm, 25 nm, 10 nm, or 5 nm, or within a range bounded by any of these values. Any of the above exemplary domain sizes may alternatively represent a mean or median domain size, as found in a particle size distribution curve. For example, in some embodiments, at least 80%, 85%, 90%, or 95% of the domains have a size up to or less than any exemplary values provided above. In some embodiments, substantially all (e.g., above 95%) or all (i.e., 100%) of the domains have a size up to or less than any exemplary values provided above.

The lignin, i.e., component (i), can be any of the wide variety of lignin compositions found in nature in lignocellulosic biomass and as known in the art. As known in the art, the lignin compositions found in nature are generally not uniform. Lignin is a random copolymer that shows significant compositional variation between plant species. Many other conditions, such as environmental conditions, age, and method of processing, influence the lignin composition. Lignins are very rich aromatic compounds containing many hydroxyl (also possible carboxylic) functional groups attached differently in both aliphatic and phenolic groups. Additionally, lignins possess highly-branched structures. These characteristics of lignins determine their corresponding physical properties. Their molar mass or molecular weight ($M_w$) is low and has very broad distributions from approximately 1000 Dalton (D) to over 10,000 D. In some embodiments, the lignin is significantly depolymerized when isolated from native biomass source and has a molar mass of less than 1000 D. Their natural branches and low $M_w$ result in very brittle characteristics. The aromatic structures and rich functional groups of lignins also lead to varied rigid and thermal properties. Lignins are amorphous polymers, which results in very broad glass transition temperatures ($T_g$), from ca. 80° C. to over 200° C. The glass transition temperatures are critical temperatures at which the lignin macromolecular chains start moving and rotating. The ability to flow at a temperature above their $T_g$s is significant for 3D-printing applications. Some lignins exhibit a very good flow property (low molten viscosity), whereas others display several orders of magnitude higher viscosity. Understanding their flow properties is vital for selecting the appropriate lignin and lignin-derivatives for composite preparation and fabrication.

Lignins differ mainly in the ratio of three alcohol units, i.e., p-coumaryl alcohol, guaiacyl alcohol, and sinapyl alcohol. The polymerization of p-coumaryl alcohol, coniferyl alcohol, and sinapyl alcohol forms the p-hydroxyphenyl (H), guaiacyl (G) and syringyl (S) components of the lignin polymer, respectively. The precursor lignin can have any of a wide variety of relative weight percents (wt %) of H, G, and S components. As observed in some seeds, lignin may also consist of caffeyl alcohol units, e.g., Chen et al. PNAS, 109(5), 1772-1777 (2012). For example, the precursor lignin may contain, independently for each component, at least, up to, or less than 1 wt %, 2 wt %, 5 wt %, 10 wt %, 20 wt %, 30 wt %, 40 wt %, 50 wt %, 60 wt %, 70 wt %, 80 wt %, or 90 wt %, or within a range thereof, of any of the caffeyl alcohol, H, G, and S components. Typically, the sum of the wt % of each alcohol component is 100%, or at least 98% if other minor components are considered. Different wood and plant sources (e.g., hardwood (HW), such as oak, maple, poplar, and the like; softwood (SW), such as pine, spruce, and the like; or grass-derived lignins, such as switchgrass, corn, bamboo, perennial grass, orchard grass, alfalfa, wheat, miscanthus, bamboo, and bagasse) often widely differ in their lignin compositions, and are all considered herein as sources of lignin. In some embodiments, depending on the desired characteristics of the polymer blend material, any one or more types of lignin, as described above, may be excluded from the polymer blend material.

Besides the natural variation of lignins, there can be further compositional variation based on the manner in which the lignin has been processed. For example, the precursor lignin can be a Kraft lignin, sulfite lignin (i.e., lignosulfonate), or a sulfur-free lignin. As known in the art, a Kraft lignin refers to lignin that results from the Kraft process. In the Kraft process, a combination of sodium hydroxide and sodium sulfide (known as "white liquor") is reacted with lignin present in biomass to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfite (depending on pH), along with a counterion, is reacted with lignin to form a lignin bearing sulfonate ($SO_3H$) groups. The sulfonate groups impart a substantial degree of water-solubility to the sulfite lignin. There are several types of sulfur-free lignins known in the art, including lignin obtained from biomass conversion technologies (such as those used in ethanol production), solvent pulping (i.e., the "organosolv" process), and soda pulping. In particular, organosolv lignins are obtained by solvent extraction from a lignocellulosic source, such as chipped wood, followed by precipitation. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins. These lignins can also be thermally devolatilized to produce a variant with less aliphatic hydroxyl groups, and molecularly restructured forms with an elevated softening point. Any one or more of the foregoing types of lignins may be used (or excluded) as a component in the method described herein for producing a polymer blend.

The lignin may also be an engineered form of lignin having a specific or optimized ratio of H, G, and S components. Lignin can be engineered by, for example, transgenic and recombinant DNA methods known in the art that cause a variation in the chemical structure in lignin and overall lignin content in biomass (e.g., F. Chen, et al., *Nature Biotechnology*, 25(7), pp. 759-761 (2007) and A. M.

Anterola, et al., *Phytochemistry*, 61, pp. 221-294 (2002)). The engineering of lignin is particularly directed to altering the ratio of G and S components of lignin (D. Guo, et al., *The Plant Cell*, 13, pp. 73-88, (January 2001). In particular, wood pulping kinetic studies show that an increase in S/G ratio significantly enhances the rate of lignin removal (L. Li, et al., *Proceedings of The National Academy of Sciences of The United States of America*, 100 (8), pp. 4939-4944 (2003)). The S units become covalently connected with two lignol monomers; on the other hand, G units can connect to three other units. Thus, an increased G content (decreasing S/G ratio) generally produces a highly branched lignin structure with more C—C bonding. In contrast, increased S content generally results in more β-aryl ether (β-O-4) linkages, which easily cleave (as compared to C—C bond) during chemical delignification, e.g., as in the Kraft pulping process. It has been shown that decreasing lignin content and altering the S/G ratio improve bioconvertability and delignification. Thus, less harsh and damaging conditions can be used for delignification (i.e., as compared to current practice using strong acid or base), which would provide a more improved lignin better suited for higher value-added applications, including manufacturing of tough polymer blends, carbon materials production (e.g., carbon fiber, carbon powder, activated carbon, microporous and mesoporous carbon) and pyrolytic or catalytic production of aromatic hydrocarbon feedstock.

Lab-scale biomass fermentations that leave a high lignin content residue have been investigated (S. D. Brown, et al., *Applied Biochemistry and Biotechnology*, 137, pp. 663-674 (2007)). These residues will contain lignin with varied molecular structure depending on the biomass source (e.g., wood species, grass, and straw). Production of value-added products from these high quality lignins would greatly improve the overall operating costs of a biorefinery. Various chemical routes have been proposed to obtain value-added products from lignin (J. E. Holladay, et al., Top Value-Added Chemicals from Biomass: Volume II—Results of Screening for Potential Candidates from Biorefinery Lignin, DOE Report, PNNL-16983 (October 2007)).

The lignin may, in some embodiments, be a crosslinked lignin that is melt-processible or amenable to melt-processing. The term "crosslinked" can mean, for example, that the lignin contains methylene (i.e., —$CH_2$—) and/or ethylene (i.e., —$CH_2CH_2$—) linkages (i.e., linking groups) between phenyl ring carbon atoms in the lignin structure. By being "melt-processible" is meant that the crosslinked lignin can be melted or converted to a molten, highly viscous, or rubbery state starting at a particular glass transition temperature. The melted or highly viscous lignin can then be more easily processed, such as by mixing, molding, applying on a surface, or dissolving in a solvent. In some embodiments, the lignin is not crosslinked. In particular embodiments, the lignin component exhibits a suitable steady shear viscosity to render it as a malleable film-forming material at the processing temperature and shear rate employed. Typically, at a melt processing condition, the steady shear viscosity of the lignin component is at least or above 100 Pa·s, 500 Pa·s, 1000 Pa·s, or 2000 Pa·s, or within a range therein. In specific embodiments, lignin forms a highly viscous melt (on the order of 10,000 Pa·s complex viscosity or higher) at a 100 $s^{-1}$ shear rate. In some embodiments, the lignin may be oxidized (e.g., by exposure to chemical oxidizing agent), while in other embodiments, the lignin is not oxidized. In some embodiments, the lignin is chemically unmodified relative to its natural extracted or isolated form. In some embodiments, the lignin is chemically modified by acetylation, oxypropylation, hydroxymethylation, epoxidation, or the like, as known in the art. In some embodiments, the lignin is plasticized with solvents or plasticizers to induce melt-processability. Solvents and plasticizers include, for example, dimethylsulfoxide, dimethylacetamide, polyoxyalkylene, and glycerol, as known in the art. In some embodiments, the use of a solvent, plasticizer, crosslinker, or chemical modification is excluded.

The lignin may have a number-average or weight-average molecular weight (i.e., $M_n$ or $M_w$, respectively) of about, up to, or less than, for example, 300, 500, 1,000, 3,000, 5,000, 8,000, 10,000, 50,000, 100,000, 500,000 or 1,000,000 g/mol, [G. Fredheim, et al., J. Chromatogr. A, 2002, 942, 191; and A. Tolbert, et al., Biofuels, Bioproducts & Biorefining 8(6) 836-856 (2014)] wherein the term "about" generally indicates no more than ±10%, ±5%, or ±1% from an indicated value. The glass transition temperature ($T_g$) of the crosslinked lignin without any plasticizer or solvent is generally from ca. 80° C. to over 200° C. In different embodiments, the lignin (either isolated or extracted lignin from biomass or its crosslinked derivative) has a glass transition temperature of precisely or about, for example, 40° C., 50° C., 60° C., 70° C., 80° C., 90° C., 100° C., 105° C., 110° C., 115° C., 120° C., 125° C., 130° C., 140° C., 150° C., 160° C., 170° C., 180° C., 190° C., 200° C., 210° C., 220° C., 230° C., or 240° C., or a $T_g$ within a range bounded by any two of the foregoing values. The polymer blend material in which the lignin is incorporated may also possess any of the glass transition temperatures or ranges thereof provided above. The lignin has a decomposition temperature ($T_d$) above its glass transition temperature. Generally, the lignin decomposes at a temperature at or above 240° C. In some embodiments, when catalyzed by chemicals or an external agent, the lignin decomposes at or below 240° C. Depending on the type of lignin, the lignin may have a decomposition temperature corresponding to any of the glass transition temperatures exemplified above starting at 150° C., e.g., a $T_d$ of 150° C., 160° C., 170° C., 180° C., 190° C., 200° C., 210° C., 220° C., 230° C., or 240° C., or a $T_d$ within a range bounded by any two of the foregoing values. In some embodiments, the lignin is highly crosslinked, and the glass transition temperature is very high. In those cases, the lignin decomposes before softening.

The lignin (in either raw form isolated from biomass or a crosslinked derivative) may be substantially soluble in a polar organic solvent or aqueous alkaline solution. As used herein, the term "substantially soluble" generally indicates that at least 1, 2, 5, 10, 20, 30, 40, 50, or 60 grams of the lignin completely dissolves in 1 deciliter (100 mL) of the polar organic solvent or aqueous alkaline solution. In other embodiments, the solubility is expressed as a wt % of the lignin in solution. In some embodiments, the lignin has sufficient solubility to produce at least a 5 wt %, 10 wt %, 15 wt %, 20 wt %, 30 wt %, 40 wt %, or 50 wt % solution in the polar organic solvent or aqueous alkaline solution. The polar organic solvent can be aprotic or protic. Some examples of polar aprotic solvents include the organoethers (e.g., diethyl ether, tetrahydrofuran, and dioxane), nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,-trichloroethane), ketones (e.g., acetone, 2-butanone), and dialkylcarbonates (e.g., ethylene carbonate, dimethylcarbonate, diethylcarbonate). Some examples of polar organic protic solvents include the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine). The aqueous alkaline solution can be any aqueous-containing solution having a pH of at least (or over) 8, 9, 10, 11, 12, or 13. The alkalizing solute can be, for example, an alkali hydroxide (e.g., NaOH or KOH), ammonia, or ammonium hydroxide. Combinations of any of these solvents may also be used. In some embodiments, the lignin is dissolved in a solvent, such as any of the solvents described above, when used to form the polymer blend. The solvent may or may not be incorporated into the final polymer blend material. In some embodiments, one or more classes or specific types of solvents (or all solvents) are excluded from any of the components (i) or (ii) or from the polymer blend material altogether.

The term "polyamide," as used herein, refers to polymers having amide (—NH—CO—) linkages and a melting point of no more than 240° C. The polyamide is typically amorphous or semi-crystalline. The polyamide typically includes at least or greater than 10, 20, 30, 40, 50, 100, 150, 200, or 250 amide linkages (or alternatively, the same number of monomeric units). In some embodiments, the number of amide linkages are as high as 1000. For purposes of the present invention, a polyamide is selected that has a melting point below the decomposition temperature of the lignin with which the polyamide is to be blended. In various embodiments, the polyamide has a melting point of precisely, about, up to, or less than, for example, 150° C., 160° C., 170° C., 180° C., 190° C., 200° C., 210° C., 215° C., 220° C., 225° C., 230° C., 235° C., or 240° C., or a melting point within a range bounded by any two of the foregoing values. In some embodiments, the polyamide is an oligopeptide, such as polylysine, polyglutamic acid, polyglycine, polyalanine, polytyrosine, or polyglutamine. In other embodiments, the polyamide is a nylon, wherein the nylon can be conveniently expressed by the formula —[C(O)—R—C(O)—NH—R'—NH]n-, where R and R' are independently selected from linear, branched, cyclic, aliphatic, saturated, or unsaturated hydrocarbon linkages containing 1, 2, 3, 4, 5, 6, 7, 8, 9, 10, 11, or 12 carbon atoms (or a range of carbon atoms bounded by any of the foregoing exemplary values, independently for R and R'), and wherein n is typically at least 5, 10, 20, 50, 100, 500, or 1000. When R and R' are both aliphatic, the nylon is considered aliphatic. If either of R or R' is aromatic, the nylon is considered aromatic. In particular embodiments, R and R' are alkyl linkages, such as in nylon 6, nylon 11, and nylon 12. The foregoing nylons are well known in the art. For purposes of the invention, poly-paraphenylene terephthalamide (aramid) is not considered an acceptable polyamide since it has a melting point over 240° C. For the purpose of this invention, neat nylon 6,6 with a melting point of about 265° C. is not considered an acceptable polyamide, unless it is plasticized or modified with additives to result in a reduced melting point of less than 240° C. In some embodiments, the plasticizing additive can be an oligomeric polyamide with a few repeat units or a solvent that lowers the dimension of the crystalline phase in the semi-crystalline nylon 6,6 where imperfect crystals melt at lower temperature than that of the original matrix. In some embodiments, nylon 6,6 is modified with particulates that creates imperfect nylon 6,6 crystals with melting points of less than 240° C.

In the polymer blend material, the lignin component (i) is present in an amount of at least 5 wt % and up to about 70 wt % by total weight of components (i) and (ii) or by weight of the polymer blend material. As both components (i) and (ii) are present in the polymer blend, each component must be in an amount less than 100 wt %. In different embodiments, the lignin component is present in the polymer blend material in an amount of about, at least, or above, for example, 1, 5, 10, 15, 20, 25, 30, 35, 40, 45, 50, 55, 60, 65, or 70 wt %, or in an amount within a range bounded by any two of the foregoing exemplary values, e.g., at least 1, 5, or 10 wt % and up to 40, 45, 50, 55, 60, 65, or 70 wt % by total weight of components (i) and (ii) or by weight of the polymer blend material.

In some embodiments, the polymer blend material further includes an elastomer feedstock, which may also be referred to as a rubber (a rubber that gets crosslinked is an elastomer). Any of the elastomers known in the art (e.g., natural, neoprene, butadiene, chloroprene, styrene-butadiene, butyl, or acrylonitrile-containing rubber), may be included. For purposes of the invention the elastomer is included in an amount of no more than 30 wt % by weight of the polymer blend material. In various embodiments, the elastomer may be included in an amount of no more than or less than 30, 25, 20, 15, 10, 5, 2, or 1 wt %, or in an amount within a range bounded by any two of the foregoing values. In other embodiments, any one or more of the above exemplified elastomers, or all elastomers, are excluded from the polymer blend material.

In particular embodiments, the elastomer is an acrylonitrile-containing copolymer rubber, as well known in the art. The acrylonitrile-containing rubber generally possesses the known or expected physical attributes of nitrile butadiene rubber materials of the art, such as a substantial extensibility, as generally evidenced in a typical ultimate elongation of at least 50%, 100%, 150%, 200%, 250%, 300%, 350%, 400%, 450%, or 500%. The acrylonitrile-containing copolymer rubber is constructed of (i.e., derived from) at least acrylonitrile units and diene monomer units. The term "diene," as used herein, refers to conjugated acyclic dienes, i.e., where the carbon-carbon double bonds are separated by a single carbon-carbon bond. In some embodiments, the diene possesses only carbon and hydrogen atoms, and optionally one or more halogen atoms. In other embodiments, the diene may include one or more functional groups that include oxygen and/or nitrogen atoms, such as those described in U.S. Pat. No. 6,583,260, which is herein incorporated by reference. Some examples of diene monomer units include, for example, butadiene (i.e., 1,3-butadiene), isoprene, chloroprene, 2-(cyanomethyl)-1,3-butadiene, and 2-(N,N-dimethylaminomethyl)-1,3-butadiene. The term "copolymer," as used herein, indicates the presence of at least two types of polymer units, wherein the at least two types of polymer units are typically present in random form or as blocks (i.e., segments), but in some cases may be engaged in alternating, periodic, branched, or graft form.

In some embodiments, the acrylonitrile rubber component contains only acrylonitrile and diene units. In the case of the acrylonitrile rubber component containing only acrylonitrile and butadiene units, it may be more specifically referred to as a "nitrile butadiene rubber" or "NBR" component. In other embodiments, the acrylonitrile rubber component contains acrylonitrile and diene units along with one or more other units, such as one or more of styrene, divinyl benzene, acrylate and methacrylate units. In some embodiments, the acrylonitrile rubber component contains functionalizing groups aside from nitrile and unsaturated carbon-carbon bonds, such as carboxy, hydroxy, ester, amino, or epoxy groups. In other embodiments, one or all of such functionalizing groups are excluded from the acrylonitrile rubber component. In some embodiments, any functionalizing groups capable of reacting with the lignin component (e.g., phenol- or hydroxy-reactive groups, such as epoxy or aldehyde groups) to form covalent bonds therewith are not present in the acrylonitrile rubber component. In some embodiments, the acrylonitrile rubber component contains only acrylonitrile and isoprene units, in which case it may be more specifically referred to as a "nitrile isoprene rubber" or "NIR" component. The acrylonitrile rubber component typically has an acrylonitrile content of at least 20 mol %. In different embodiments, the acrylonitrile rubber component has an acrylonitrile content of about, at least, or above 20, 25, 30, 33, 35, 38, 40, 42, 45, 48, 50, 52, or 55 mol %, or an acrylonitrile content within a range bounded by any two of the foregoing values.

The acrylonitrile rubber, if included in the polymer blend material, can have any suitable weight-average molecular weight ($M_w$), such as precisely, about, at least, above, up to, or less than, for example, 2,500 g/mol, 3,000 g/mol, 5,000 g/mol, 10,000 g/mol, 50,000 g/mol, 100,000 g/mol, 150,000 g/mol, 200,000 g/mol, 300,000 g/mol, 400,000 g/mol, 500,000 g/mol, or 1,000,000 g/mol, or a molecular weight within a range bounded by any two of the foregoing exemplary values. The acrylonitrile rubber component may also have any suitable number-average molecular weight ($M_n$), wherein n can correspond to any of the numbers provided above for $M_w$.

The polymer blend material described herein may or may not also include one or more additional components. For example, in some embodiments, an agent that favorably modifies the physical properties (e.g., tensile strength, modulus, and/or elongation) may be included. Some of these modifying agents include, for example, carbon particles, metal particles, silicon-containing particles (e.g., silica or silicate particles), ether-containing polymers, Lewis acid compounds, solvents or plasticizers, and metal oxide compounds. In some embodiments, one or more such modifying agents are each independently, or in total, present in an amount of up to or less than 40, 30, 20, 15, 10, 5, 4, 3, 2, or 1 wt % by weight of the polymer blend material, or one or more such components are excluded from the polymer blend material.

The carbon particles, if present in the polymer blend material, can be any of the carbon particles known in the art that are composed at least partly or completely of elemental carbon, and may be conductive, semiconductive, or non-conductive. The carbon particles may be nanoparticles (e.g., at least 1, 2, 5, or 10 nm, and up to 20, 50, 100, 200, or 500 nm), microparticles (e.g., at least 1, 2, 5, or 10 µm, and up to 20, 50, 100, 200, or 500 µm), or macroparticles (e.g., above 500 µm, or at least or up to 1, 2, 5, 10, 20, 50, or 100 mm). Some examples of carbon particles include carbon black ("CB"), carbon onion ("CO"), a spherical fullerene (e.g., buckminsterfullerene, i.e., $C_{60}$, as well as any of the smaller or larger buckyballs, such as $C_{20}$ or $C_{70}$), a tubular fullerene (e.g., single-walled, double-walled, or multi-walled carbon nanotubes), carbon nanodiamonds, carbon nanohorns, and carbon nanobuds, all of which have compositions and physical and electrical properties well-known in the art. As known in the art, fully graphitized carbon nanodiamonds can be considered to be carbon onions.

In some embodiments, the carbon particles are made exclusively of carbon, while in other embodiments, the carbon particles can include an amount of one or a combination of non-carbon non-hydrogen (i.e., hetero-dopant) elements, such as nitrogen, oxygen, sulfur, boron, silicon, phosphorus, or a metal, such as an alkali metal (e.g., lithium), alkaline earth metal, transition metal, main group metal (e.g., Al, Ga, or In), or rare earth metal. Some examples of binary carbon compositions include silicon carbide (SiC) and tungsten carbide (WC). The amount of hetero element can be a minor amount (e.g., up to 0.1, 0.5, 1, 2, or 5 wt % or mol %) or a more substantial amount (e.g., about, at least, or up to 10, 15, 20, 25, 30, 40, or 50 wt % or mol %). In some embodiments, any one or more of the specifically recited classes or specific types of carbon particles or any one or more of the specifically recited classes or specific types of hetero-dopant elements are excluded from the carbon particles.

In some embodiments, the carbon particles can be nanoscopic, microscopic, or macroscopic segments of any of the high strength continuous carbon fiber compositions known in the art. Some examples of carbon fiber compositions include those produced by the pyrolysis of polyacrylonitrile (PAN), viscose, rayon, pitch, lignin, and polyolefins, any of which may or may not be heteroatom-doped, such as with nitrogen, boron, oxygen, sulfur, or phosphorus. The carbon fiber may alternatively be vapor grown carbon nanofibers. The carbon particles may also be two-dimensional carbon materials, such as graphene, graphene oxide, or graphene nanoribbons, which may be derived from, for example, natural graphite, carbon fibers, carbon nanofibers, single walled carbon nanotubes and multi-walled carbon nanotubes. The carbon fiber typically possesses a high tensile strength, such as at least 500, 1000, 2000, 3000, 5000, 7,000, or 10,000 MPa, or higher, with a degree of stiffness generally of the order of steel or higher (e.g., 100-1000 GPa). In some embodiments, any one or more classes or specific types of the foregoing carbon particles are excluded from the polymer blend.

An ether-containing polymer, if present in the polymer blend material, can be, for example, a polyalkylene oxide (i.e., polyethylene glycol) or a copolymer thereof. Some examples of polyalkylene oxides include the polyethylene oxides, polypropylene oxides, polybutylene oxides, and copolymers thereof or with ethylene, propylene, or allyl glycidyl ether. The ether-containing polymer may also be, for example, a polyvinyl cyanoethyl ether, as described in, for example, U.S. Pat. No. 2,341,553, the contents of which are herein incorporated by reference. The ether-containing polymer may also be, for example, an etherified form of PVA, such as poly(vinyl methyl ether), which may correspond to CAS No. 9003-09-2. The ether-containing polymer may also be, for example, a phenyl ether polymer, which may be a polyphenyl ether (PPE) or polyphenylene oxide (PPO). The ether-containing polymer may also include cyclic ether groups, such as epoxide or glycidyl groups, or as further described in, for example, U.S. Pat. No. 4,260,702, the contents of which are herein incorporated by reference. The cyclic ether polymer may also be a cyclic anhydride modified polyvinyl acetal, as further described in U.S. Pat. No. 6,555,617, or a cyclic or spirocyclic polyacetal ether, as further described in, for example, A. G. Pemba, et al., *Polym. Chem.*, 5, 3214-3221 (2014), the contents of which are herein incorporated by reference. In yet other embodiments, the ether-containing polymer may be a cyclic or non-cyclic thioether-containing polymer, such as a polyphenyl thioether or polyphenylene sulfide. In some embodiments, any one or more classes or specific types of the foregoing ether-containing polymers are excluded from the polymer blend.

Lewis acid compounds, if present in the polymer blend material, can be any of the compounds known in the art having Lewis acid character, i.e., strongly electrophilic by virtue of a deficiency of electrons. Some examples of Lewis acid compounds include boron-containing compounds (e.g., boric acid, borates, borate esters, boranes, and boron halides, such as $BF_3$, $BCl_3$, and $BBr_3$), aluminum-containing compounds (e.g., aluminum hydroxide, aluminates, aluminate esters, and aluminum halides, such as $AlF_3$, $AlCl_3$, and $AlBr_3$), and tin-containing compounds, such as stannic acid, tin esters (e.g., tin(II) acetate or tin(II) 2-ethylhexanoate), tin alkoxides (e.g., tin(IV) ethoxide), and tin halides, such as $SnF_4$, $SnCl_4$, $SnBr_4$, and $SnI_4$. In some embodiments, any one or more classes or specific types of the foregoing Lewis acid compounds are excluded from the polymer blend.

Metal oxide compounds, if present in the polymer blend material, can have any metal oxide composition, typically particulate in form, that can function to improve a physical characteristic of the polymer blend material. The metal of the metal oxide composition can be, for example, an alkali metal, alkaline earth metal, main group metal, transition metal, or lanthanide metal. Some examples of alkali metal oxides include $Li_2O$, $Na_2O$, $K_2O$, and $Rb_2O$. Some examples of alkaline earth metal oxide compositions include BeO, MgO, CaO, and SrO. Some examples of main group metal oxide compositions include $B_2O_3$, $Ga_2O_3$, SnO, $SnO_2$, PbO, $PbO_2$, $Sb_2O_3$, $Sb_2O_5$, and $Bi_2O_3$. Some examples of transition metal oxide compositions include $Sc_2O_3$, $TiO_2$, $Cr_2O_3$, $Fe_2O_3$, $Fe_3O_4$, FeO, $Co_2O_3$, $Ni_2O_3$, CuO, $Cu_2O$, ZnO, $Y_2O_3$, $ZrO_2$, $NbO_2$, $Nb_2O_5$, $RuO_2$, PdO, $Ag_2O$, CdO, $HfO_2$, $Ta_2O_5$, $WO_2$, and $PtO_2$. Some examples of lanthanide metal oxide compositions include $La_2O_3$, $Ce_2O$, and $CeO_2$. In some embodiments, any one or more classes or specific types of the foregoing metal oxides (or all metal oxides) are excluded from the polymer blend.

Metal particles, if present in the polymer blend material, may be included to modulate the electrical conductivity, thermal conductivity, strength, or magnetic properties of the produced object. The metal particles may be composed of or include, for example, iron, cobalt, nickel, copper, zinc, palladium, platinum, silver, gold, aluminum, silicon, or tin, or a combination thereof. The metal particles may include at least a portion of the metal in its elemental (zerovalent) state. The metal particles may alternatively have a metal carbide, metal nitride, or metal silicide composition. In some embodiments, any one or more classes or specific types of the foregoing metal particles (or all metal particles) are excluded from the polymer blend.

A halogen-containing polymer, which may also function as a modifying agent, may or may not be present in the polymer blend material. The halogen-containing polymer, if present in the polymer blend material, can have the halogen atoms bound to aliphatic (i.e., non-aromatic, e.g., alkyl or alkenyl) or aromatic groups, as described above for a hydroxy-containing polymer. The halogen atoms can be, for example, fluorine, chlorine, and bromine atoms. Some examples of fluorinated polymers include poly(vinyl fluoride), poly(vinylidene fluoride), poly(tetrafluoroethylene), fluorinated ethylene-propylene copolymer, poly(ethylenetetrafluoroethylene), poly(perfluorosulfonic acid), and fluoroelastomers. Some examples of chlorinated polymers include poly(vinyl chloride), polyvinylidene chloride, ethylene-chlorotrifluoroethylene copolymer, polychloroprene, halogenated butyl rubbers, chlorinated polyethylene, chlorosulfonated polyethylene, chlorinated polypropylene, chlorinated ethylene-propylene copolymer, and chlorinated polyvinyl chloride. Some examples of brominated polymers include poly(vinyl bromide), and brominated flame retardants known in the art, such as brominated epoxy, poly (brominated acrylate), brominated polycarbonate, and brominated polyols.

In another aspect, the present disclosure is directed to methods for producing the polymer blend material described above. The process generally employs melting and blending of the components; thus, the process may be referred to as a "melt blending" process. The process for preparing the polymer blend material can employ any of the weight percentages (i.e., wt %) of components provided in the above earlier description of the polymer blend material. In the method, at least (or only) the components (i) and (ii) are mixed and homogeneously blended to form the polymer blend material. Any one of the components can be included in liquid form (if applicable), in solution form, or in particulate or granular form. In the case of particles, the particles may be, independently, nanoparticles (e.g., at least 1, 2, 5, or 10 nm, and up to 20, 50, 100, 200, or 500 nm), microparticles (e.g., at least 1, 2, 5, or 10 µm, and up to 20, 50, 100, 200, or 500 µm), or macroparticles (e.g., above 500 µm, or at least or up to 1, 2, 5, 25, 50, 100, 500, or 1000 mm). Typically, if a polymeric component is provided in particle or granular form, the particles are melted or softened by appropriate heating to permit homogeneous blending and uniform dispersion of the components. The temperature employed for melting the components should be below the decomposition temperature of the lignin, generally a temperature of no more than or less than 200° C., 210° C., 220° C., 230° C., or 240° C. The components can be homogeneously blended by any of the methodologies known in the art for achieving homogeneous blends of solid, semi-solid, gel, paste, or liquid mixtures. Some examples of applicable blending processes include simple or high speed melt mixing, compounding, extrusion, two-roll milling, or ball mixing, all of which are well-known in the art. In some embodiments, one or more of the components are in solid bale form and these are cut into useable chunks using standard bale cutting tools. The chunks of the components are typically mixed, melted, and blended (melt blended) in an internal mixer, such as a Banbury mixer. In other embodiments, one or more of the components are in sheet form and the components are mixed in a two-roll mill. For purposes of the present invention, the polymer blend should exhibit a melt viscosity of no more than 500, 1000, 1500, or 2000 Pa·s at a shear rate of 100-1000 $s^{-1}$ when heated to a temperature of no more than 240° C.

The melt blending process is conducted at a temperature at which the components (i) and (ii) melt, provided that the temperature is below the decomposition temperature of the lignin. For example, the melt process may be conducted at a temperature of at least or above 100° C., 120° C., 130° C., 140° C., or 150° C., and up to or less than 160° C., 170° C., 180° C., 190° C., 200° C., 210° C., 220° C., 230° C., or 240° C., or within a range bounded by any two of the foregoing temperatures. In some embodiments, in order to provide the melt of the polymer blend material with the proper viscosity and toughness to be melt extruded to form an object, the melt of the polymer blend material may be subjected to a suitable shear rate, such as a shear rate within a range of 100-1000 $s^{-1}$ (for sufficient time) to achieve a melt viscosity of no more than 2000, 1500, 1000, or 500 Pa·s. In different embodiments, a shear rate of precisely or about 100, 150, 200, 250, 300, 350, 400, 450, 500, 600, 700, 800, 900, 1000, 2000, 3000, 4000, 5000, 10,000, 15,000, or 20,000 $s^{-1}$ is employed, or a shear rate within a range bounded by any two of the foregoing values is employed, to result in a melt viscosity of precisely, about, up to, or less than, for example, 2000, 1500, 1250, 1000, 900, 800, 700, 600, 500, 400, 300, 200, or 100 Pa·s, or a melt viscosity within a range bounded by any two of the foregoing values.

The result of the above process is a polymer blend material in melt or solid form in which the components are homogeneously blended (i.e., the lignin is homogeneously dispersed in the polyamide). By being "homogeneously blended" is meant that, in the macro (e.g., millimeter) scale, no discernible regions of at least components (i) and (ii) exist in the polymer blend material produced by the above process. If a modifying agent, as discussed above, is included, all or a portion of the modifying agent may or may not remain in the solid (unmelted) phase, e.g., either in elemental state (e.g., carbon particles) or in crystalline lamella phase (e.g., polyethylene oxide). In other words, the homogeneous blend may possess a modified or compatibilized phase structure (not necessarily a single phase structure, but often with retained but shifted $T_g$ associated with individual phases) for at least components (i) and (ii). The modified-phase structure generally indicates near homogeneous integration at microscale or near the molecular level without losing each component's identity. In the case of an additional non-homogeneous component, the instantly described polymer blend including components (i) and (ii) can be viewed as a "homogeneous matrix" in which the additional non-homogeneous component is incorporated. In preferred embodiments, each of the components retain their identities, and the components are well dispersed at the nanometer scale.

In another aspect, the invention is directed to a method for producing an object made of the solid polymer blend material described above. Since the melt of the solid polymer blend material has low viscosity (no more than 2000 Pa·s), the melt flows very easily. In this invention, the ease of flow of the melt is exploited to form an object at a faster rate (volume of material that can exit a die per unit time). In one set of embodiments, the polymer blend produced by melt blending in step (a) is in melt form, and the melt is formed into an object, such as by employing an extrusion or casting process on the melt. In another set of embodiments, the polymer blend produced by melt blending in step (a) is in solid form (i.e., after sufficient cooling and solidification), and the solid polymer blend is used as a feed material in a shape-forming or object-building process in which the solid polymer blend is melted in a successive step and then formed into an object as above, such as by employing an extrusion or casting process on the melt. Notably, the melting process, whether on the components (i) and (ii) during blending, or on the solid polymer blend, should be below the decomposition temperature of the lignin.

In some embodiments, the melting process occurs in a heating chamber containing a nozzle, and pressure is induced on the melt of the polymer blend material while the polymer blend material is in the heating chamber to adjust the flow rate of the melt through the nozzle to result in the melt having a melt viscosity of no more than 2000, 1500, 1000, 800, or 500 Pa·s. By one exemplary method, the heating chamber is connected to (which may include being in contact with) a piston that induces pressure on the melt of the polymer blend material as the piston pushes the melt through the nozzle. By another exemplary method, pressure is induced on the melt of the polymer blend material by exerting pressure on a solid filament of the polymer blend material as the solid filament is being fed into the heating chamber, wherein the pressure pushes the solid filament into the heating chamber at a desired flow rate. In other embodiments, the polymer blend is provided with the desired melt viscosity by subjecting the melt to a suitable shearing force, such as any of the shearing forces described above.

The melting process is conducted at a temperature at which the polyamide melts, which is generally well above the temperature at which the lignin melts, provided that the temperature is also below the decomposition temperature of the lignin. For example, the melt process may be conducted at a temperature of at least or above 100° C., 120° C. 130° C., 140° C., or 150° C., and up to or less than 160° C., 170° C., 180° C., 190° C., 200° C., 210° C., 220° C., 230° C., or 240° C., or within a range bounded by any two of the foregoing temperatures. In some embodiments, in order to provide the melt of the polymer blend material with the proper viscosity and toughness to be melt extruded to form an object, the melt of the polymer blend material be subjected to a shear rate within a range of 100-1000 $s^{-1}$ (for sufficient time) to achieve a melt viscosity of no more than 2000, 1500, 1000, 800, or 500 Pa·s. In different embodiments, a shear rate of precisely or about 100, 150, 200, 250, 300, 350, 400, 450, 500, 600, 700, 800, 900, 1000, 2000, 3000, 4000, 5000, 10,000, 15,000, or 20,000 $s^{-1}$ is employed, or a shear rate within a range bounded by any two of the foregoing values is employed, to result in a melt viscosity of precisely, about, up to, or less than, for example, 2000, 1500, 1250, 1000, 900, 800, 700, 600, 500, 400, 300, 200, or 100 Pa·s, or a melt viscosity within a range bounded by any two of the foregoing values.

In a first set of embodiments, the melted polymer blend is subjected to casting process to form an object. The casting process can be, for example, injection molding, or more specifically, a resin transfer molding process, all of which are well known in the art. The casting process may alternatively be a compression molding process, as also well known in the art.

In a second set of embodiments, the melted polymer blend is subjected to a melt extrusion process to produce a desired shape of the polymer blend. The melt extrusion process can be, for example, any of the additive manufacturing (AM) processes known in art. In the AM process, the solid polymer blend material or a melt version of the blend material can be used as feed material in an AM device. In the case where the solid polymer blend material is used as feed material, the AM device typically includes device components (e.g., a chamber with required heating and mixing elements) for melting, mixing, and applying the necessary pressure and/or shear forces to the polymer blend material to provide the melt with the necessary viscosity. The AM process can be any of the additive processes well known in the art, such as a rapid prototyping (RP) unit, or more particularly, a fused deposition modeling (FDM) unit or a fused filament fabrication (FFF) device. The AM device may be, more particularly, a 3D printer. As well known in the art, the additive process (particularly FDM or 3D printing process) generally operates by hot extruding the build material (in this case, the polymer blend material) through a die or nozzle of suitable shape, and repeatedly depositing discrete amounts (e.g., beads) of the build material in designated locations to build an object. The temperature of the melted polymer blend material, when exiting the nozzle, can be any of the temperatures, as provided above, at which melting is conducted, or a temperature at which the polymer blend material is extrudable but not in a completely melted state, i.e., a temperature slightly below (e.g., 1-10° C. below) the melting temperature of the polymer blend material. In some embodiments, to form the melt, the solid polymer blend is subjected to a temperature of at least or above the glass transition temperature and no more than 10° C. above the glass transition temperature of the solid polymer blend material and no more than 240° C. (the degradation temperature of lignin) to produce a melt of the solid polymer blend material.

Upon exiting the die (i.e., nozzle) in the AM unit, the polymer blend material cools and solidifies. In the FDM or 3D printing process, the nozzle is moved in precise horizontal and vertical positions as beads of the polymer blend material are deposited. In this way, the additive process can build an object layer by layer using the feed material. The nozzle movements and flow rate are generally controlled by computer software, typically a computer-aided manufacturing (CAM) software package. The FDM or 3D printer builds an object (article) based on instructions provided by a computer program that includes precise specifications of the object (article) to be constructed. The object may be useful as, for example, a structural support, such as a component of the interior or exterior of an automobile, furniture, a tool or utensil, or a structural object (e.g., sheet or plate). In some embodiments, the polymer blend may correspond to a coating or film, such as a protective film.

The flow rate of the polymer blend material (e.g., through a nozzle) can also be suitably modulated to adjust the melt viscosity of the polymer blend material. The flow rate of the melt can be controlled by varying the material feed rate during the printing process and by adjusting the printing nozzle size. The following table includes some exemplary values of material feed rate (v, in mm/s) and nozzle size (R, in mm) that can result in an acceptable melt viscosity and stiffness of the polymer blend material for use in an additive manufacturing process. In some embodiments, a particular range in nozzle size (radius) and/or feed rate may be selected from Table 1 below, with possible exclusion of some of the nozzle sizes and/or feed rates shown in Table 1. Table 1 shows the effect of v and R on shear rate ($\gamma$), where $\gamma=4Q/\pi R^3$ (where the shear rates with astericks may be preferred).

TABLE 1

Shear rate ($s^{-1}$) equivalent for three selected filament feed rates (mm/s) for various radii of printing nozzle (mm)

| R (radius of printing nozzle, mm) | Feed rate of 200 mm/s | Feed rate of 100 mm/s | Feed rate of 50 mm/s |
|---|---|---|---|
| 1 | 800 | 400 | 200 |
| 0.75 | 1067 | 533 | 367 |
| 0.5 | 1600* | 800* | 400* |
| 0.35 | 2286* | 1143* | 571* |
| 0.25 | 3200 | 1600 | 800 |
| 0.15 | 5333 | 2667 | 1333 |
| 0.1 | 8000 | 4000 | 2000 |

*may be preferred shear rates

Examples have been set forth below for the purpose of illustration and to describe certain specific embodiments of the invention. However, the scope of this invention is not to be in any way limited by the examples set forth herein.

EXAMPLES

Composite Synthesis and Printing

Hardwood (HW) lignin was melt mixed with nylon 12 at 40 to 60 wt % lignin loading, and the resulting three-point bending storage modulus was found to meet the stiffness requirements for rapid filament loading. As an added benefit, nylon 12 is an engineering thermoplastic that can also be synthesized from renewables; thus, a lignin/nylon 12 alloy has the potential to create a 100% renewable printable product. A Brabender Plasti-Corder Torque Rheometer fitted with a half-size (30 cc) mixing chamber and high-shear twin roller blades were utilized for the melt-mixing of nylon and lignin. Specifically, nylon 12 was pre-melted and mixed at 190° C. and 90 rpm for 5 minutes. Then, HW lignin was slowly added and mixed for a total of 15 minutes. The HW lignin content was varied from 40 to 60 wt %. A composition of 40 wt % HW lignin in nylon 12 was selected to prepare the composites with carbon fiber (CF). After mixing HW lignin and nylon 12 for 15 minutes, CFs were added and mixed for a total of 30 minutes. The CF content ranged from 4 to 16 wt %. The samples were hot pressed in a hydraulic Carver press at 190° C. for 10 minutes for characterization Filaments of selected composites of 40 wt % HW lignin in nylon 12 were extruded at 210° C. using a custom-designed single-shot extruder equipped with a single die. The filament diameter was ca. 2.5 mm. The materials were 3D printed on a printer equipped with a 0.5-mm-diameter nozzle. The printing and the bed temperatures were 230° and 100° C., respectively. All samples were 3D printed, with the same printing protocol for comparison.

Characterization

The tensile Young's modulus of pristine nylon 12 is only 1.77±0.15 GPa, and the addition of 40 wt % HW lignin in nylon 12 significantly increased the modulus to 3.01±0.59 GPa (approximately 70% increase in tensile Young's modulus). Notably, the presence of 40 wt % HW lignin was also found to maintain a similar tensile strength with pristine nylon 12. The reinforcement of these composites arises from rigid phenolic units at room temperature. The formation of spherical lignin particles dispersed in the nylon matrix enhanced the mechanical stiffness of the composites.

Scanning electron microscopy (SEM) imaging was performed on the three different compositions of HW lignin (40, 50, and 60 wt %) in the nylon 12 matrix. In these compositions, the diameter of lignin particles varies from ca. 100 nm to ca. 3 μm, and particle size enlarges with increasing lignin content.

A recently developed model to predict the maximum loading velocity of ABS filament using a dashpot or syringe-piston type printing device or a LulzBot printer suggests that the maximum loading speed of ABS at $T_{ref}=250°$ C. is approximately 4.5 mm/s and the minimum velocity of feeding the filament is approximately 0.29 mm/s (M. E. Mackay et al, The performance of the hot end in a plasticating 3d printer. *J. Rheol.* 61, 229-236 (2017)). Based on this data and the analysis shown in Table 2 (below) for printable polymers using a 3D printer nozzle of 0.5 mm diameter, it was herein found that an excellent printability of the melt occurs when the viscosity remains in the 70-500 Pa·s range.

TABLE 2

Shear rate and viscosity window for good printability for specific filament feeding speed ($V_f$), diameter of the filament ($D_f$), diameter of the printing nozzle (d), and non-Newtonian fluid viscosity power law index (n).

| $V_f$ mm/s | $D_f$ | d | n | Appearance shear rate ($s^{-1}$) | True shear rate ($s^{-1}$) | Viscosity (Pa · s) |
|---|---|---|---|---|---|---|
| 0.29 | 2.88 | 0.5 | 0.49 | 154 | 193 | 500 |
| 1 | 2.88 | 0.5 | 0.49 | 531 | 668 | 220 |
| 1.5 | 2.88 | 0.5 | 0.49 | 796 | 1003 | 170 |
| 2 | 2.88 | 0.5 | 0.49 | 1062 | 1337 | 140 |
| 2.5 | 2.88 | 0.5 | 0.49 | 1327 | 1672 | 120 |
| 3 | 2.88 | 0.5 | 0.49 | 1593 | 2006 | 100 |

TABLE 2-continued

Shear rate and viscosity window for good printability for specific filament feeding speed ($V_f$), diameter of the filament ($D_f$), diameter of the printing nozzle (d), and non-Newtonian fluid viscosity power law index (n).

| $V_f$ mm/s | $D_f$ | d | n | Appearance shear rate ($s^{-1}$) | True shear rate ($s^{-1}$) | Viscosity (Pa · s) |
|---|---|---|---|---|---|---|
| 3.5 | 2.88 | 0.5 | 0.49 | 1858 | 2341 | 88 |
| 4 | 2.88 | 0.5 | 0.49 | 2123 | 2675 | 80 |
| 4.5 | 2.88 | 0.5 | 0.49 | 2389 | 3009 | 70 |

Figure 1B:
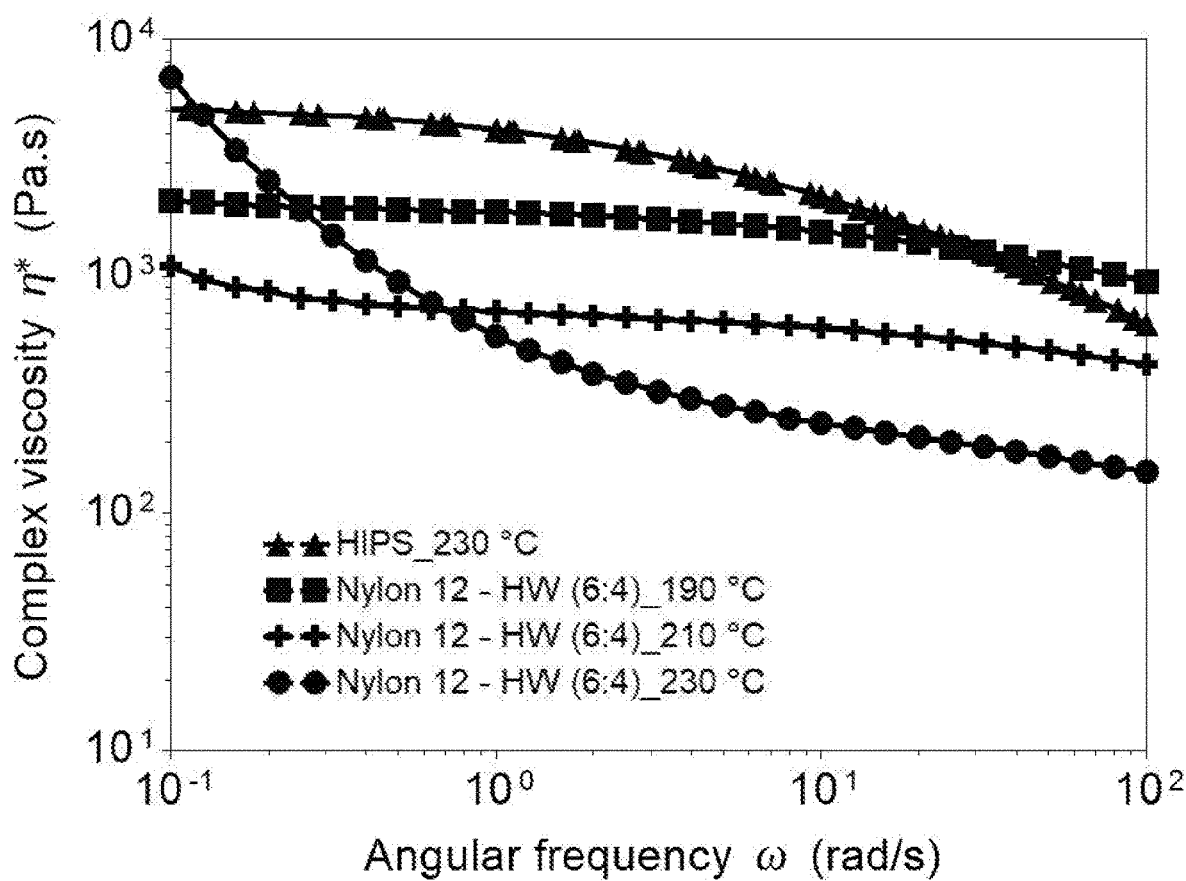
Figure 1C:
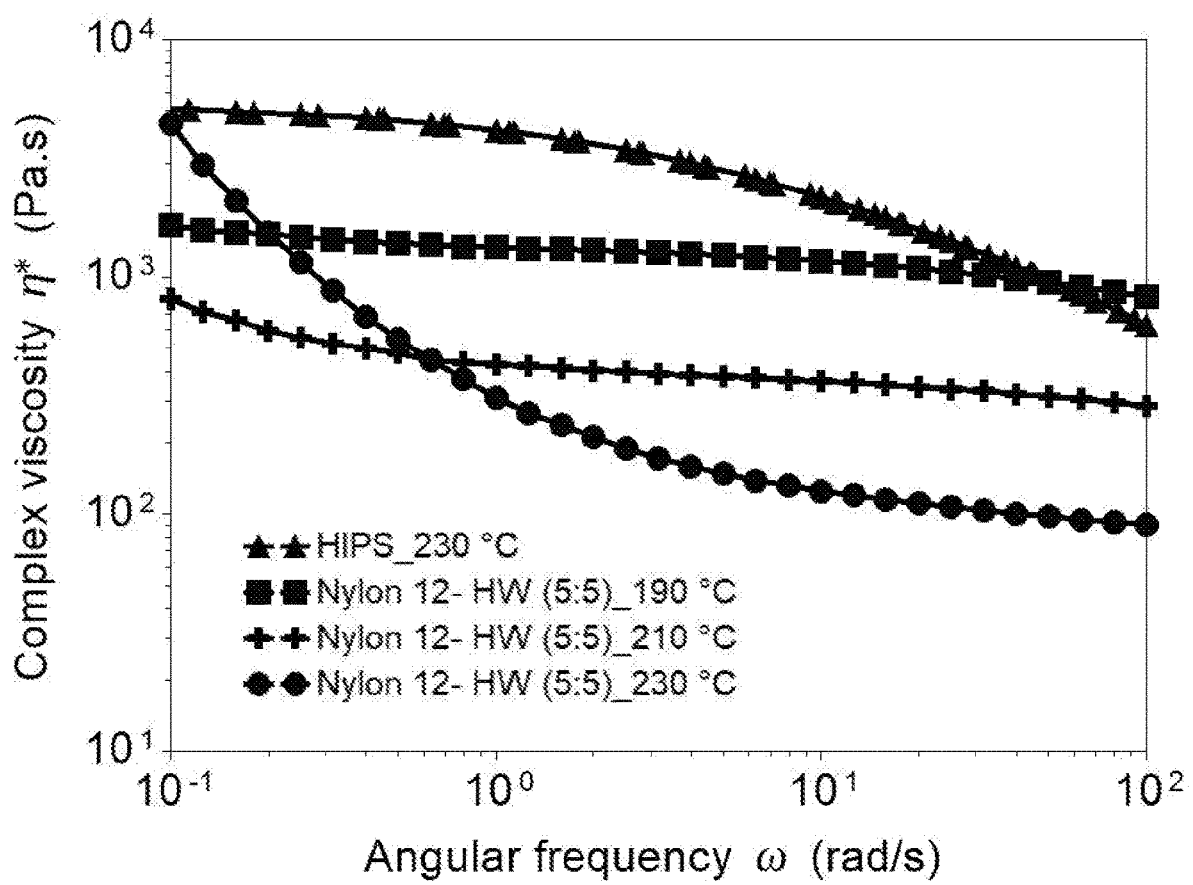
Figure 1D:
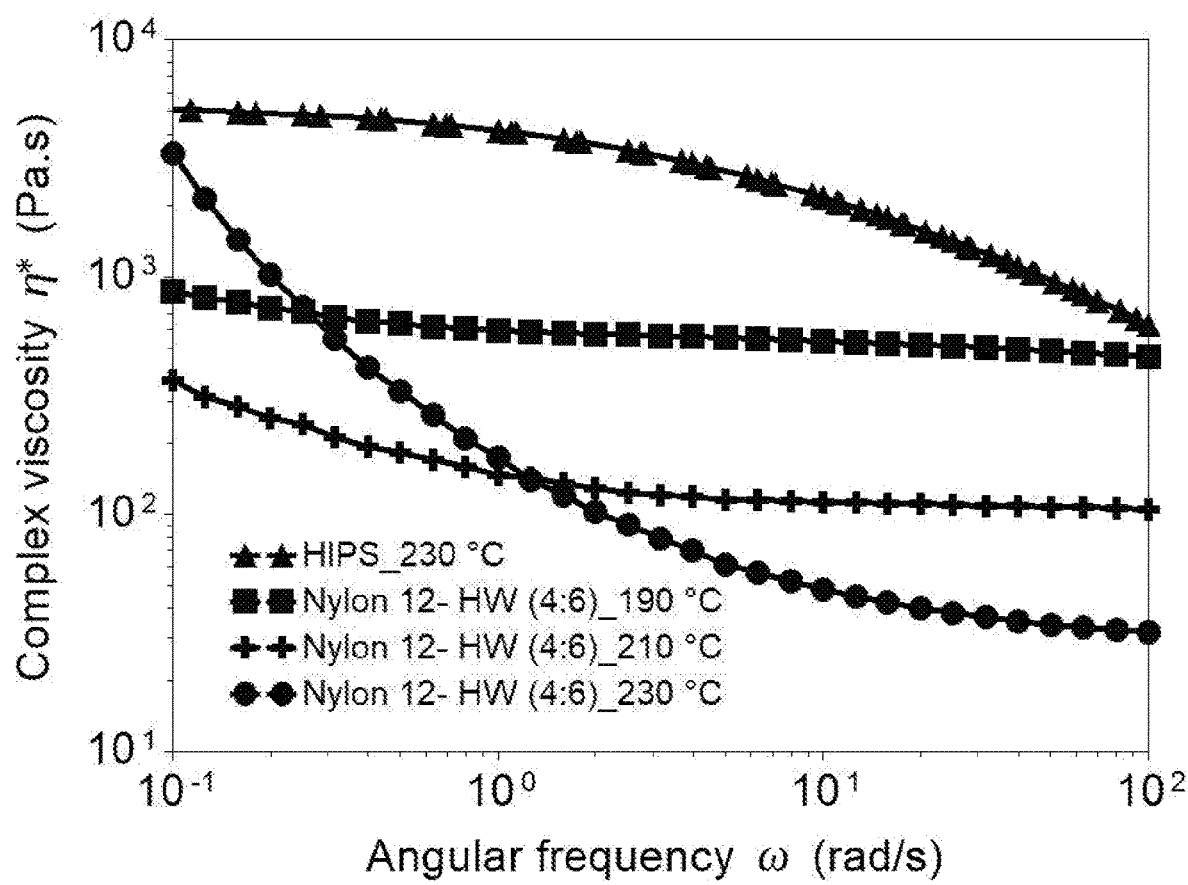
Figure 1E:
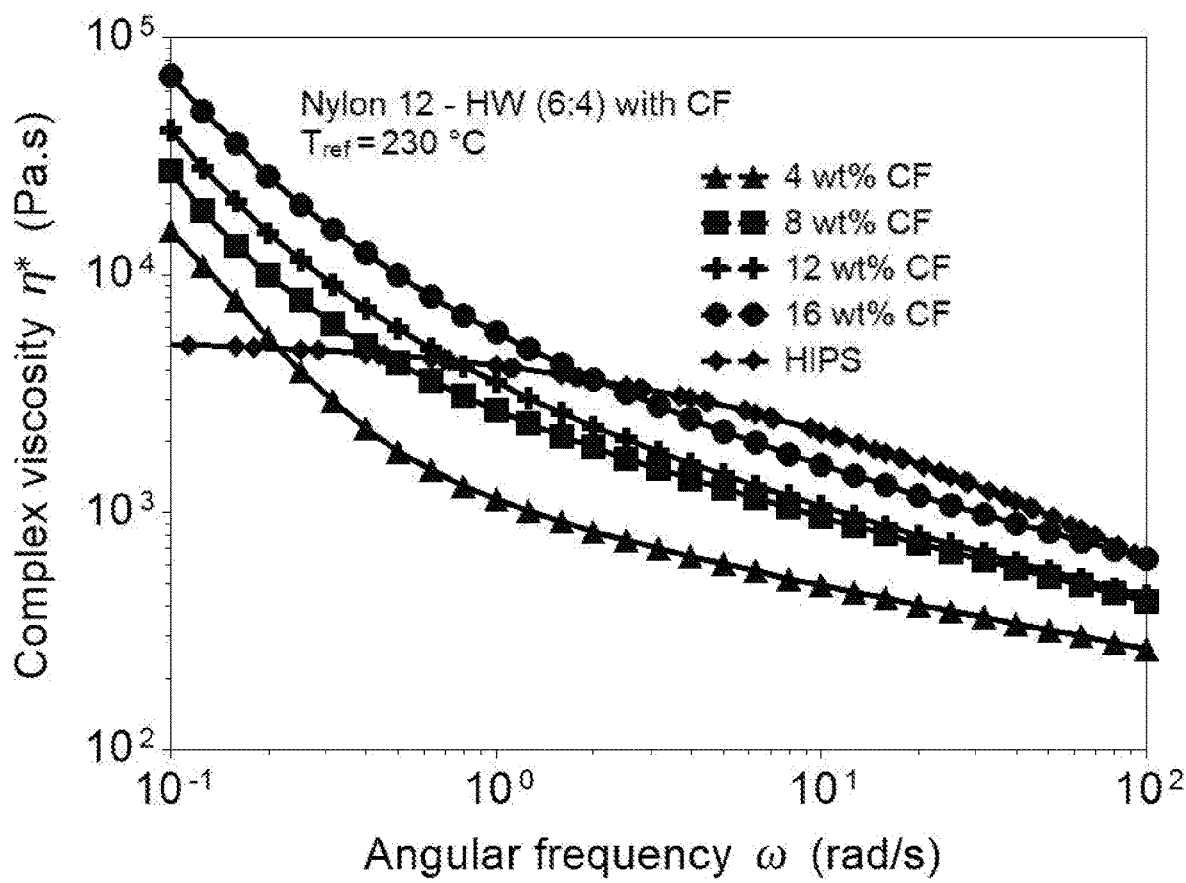

The formation of thermoreversible phase-separated lignin offers interesting properties of the investigated composites. The presence of spherical HW lignin particles with low melt viscosity improved the flow characteristics of nylon 12. Low melt viscosity of HW lignin at high temperatures arises from flexible linkages, such as b-O-4', ether, and aliphatic chains. The rheological results are shown in FIGS. 1A-1E. FIG. 1A shows results for high impact polystyrene (HIPS) and nylon 12; FIG. 1B shows results for HIPS and nylon 12 with 40 wt % HW lignin; FIG. 1C shows results for HIPS and nylon 12 with 50 wt % HW lignin; FIG. 1D shows results for HIPS and nylon 12 with 60 wt % HW lignin; and FIG. 1E shows results at a reference temperature of 230° C. of HIPS and HW-nylon 12 (40 wt % HW lignin) with different carbon fiber (CF) contents (from 4 to 16 wt % CF). Notably, the measured rheological results indicate a much lower melt viscosity of lignin-modified nylon 12 compared to that of neat nylon 12 and HIPS matrices at $T_{ref}$=230° C. At 230° C. and in the high-shear rate regime (equivalent to 100 rad/s), nylon 12 has higher melt viscosity (ca. 1050 Pa·s) than HIPS (ca. 630 Pa·s). Thus, the formation of fine spherical lignin particles within the nylon 12 matrix causes a reinforcement effect at room temperature but introduces plasticization in the melt. The significantly low melt viscosity of HW lignin particles, for example, ca. 100 Pa·s at 190° C. in the frequency range from 10 to 100 rad/s, causes it to behave like a lubricant phase and mobilizes the nylon macromolecules. Increasing HW lignin content from 40 to 60 wt % further drops the melt viscosity of the nylon 12 significantly (FIGS. 1B-1D). For example, at $T_{ref}$=230° C. and at an angular frequency of 100 rad/s, the complex viscosities of compositions containing 40, 50, and 60 wt % HW lignin are ca. 150, 91, and 32 Pa·s, respectively. Thus, nylon 12-HW lignin alloys reveal good flow characteristics that match the required viscosity and shear rate windows for 3D printing. The addition of rigid and high-aspect ratio fillers, such as carbon fibers (CFs), that do not melt in polymers, significantly improves the polymer mechanical properties but usually increases the melt viscosities of the composites. In this study, the HW lignin filler demonstrates contradictory characteristics, for example, it is stiffer at room temperature yet flows better in the melt.

During the 3D-printing process, the molten material is extruded and deposited layer by layer at a high shear rate. The shear rate applied on the newly printed layer is significantly reduced (approaching zero shear) after deposition. Therefore, it requires a relatively high melt modulus to maintain the 3D shape of the printed object. In addition, the large deformation caused by the movement of the printer nozzle and high melt extruding flow right after depositing the material requires the molten polymer to have high yield stress to stabilize the printed shape. In these experiments, an unexpected finding was that at 230° C. the zero-shear complex viscosity (i.e., viscosity at ~$10^{-1}$ rad/s angular frequency) of nylon 12-HW lignin alloys are higher than those observed at 190° C. or 210° C. (FIGS. 1B-1C). These surprising results are likely due to temperature induced miscibility between nylon 12 and HW lignin that enhances immobilization of nylon matrix. Such a high zero-shear viscosity offers dimensional stability in the viscoelastic printed layer. The principle of liquid-like materials, such as colloidal gels and hydrogel extrusion, was additionally used in 3D-printing technology; in this case, the viscoelastic response of the gel-like materials is critical. The materials must have high shear-thinning behavior and should retain the 3D structure after deposition. Therefore, for good printability, a processing window is defined: The viscosity should be between 20 and 280 Pa·s, the modulus should range from $10^3$ to $10^5$ Pa, and the yield stress should have a value from ca. 150 to $10^3$ Pa. In this study, both the storage modulus and yield stress of these nylon/lignin composite melts are within the range of ca. $10^3$ to $10^5$ Pa, which is comparable to the required yield stress and the storage modulus to maintain good dimensional stability after deposition. Filaments extruded from the lignin-based materials have sufficient flexibility to be rolled and loaded in a 3D printer. This flexibility depends on the lignin content in which decreasing lignin content increases flexibility.

Figure 2A:
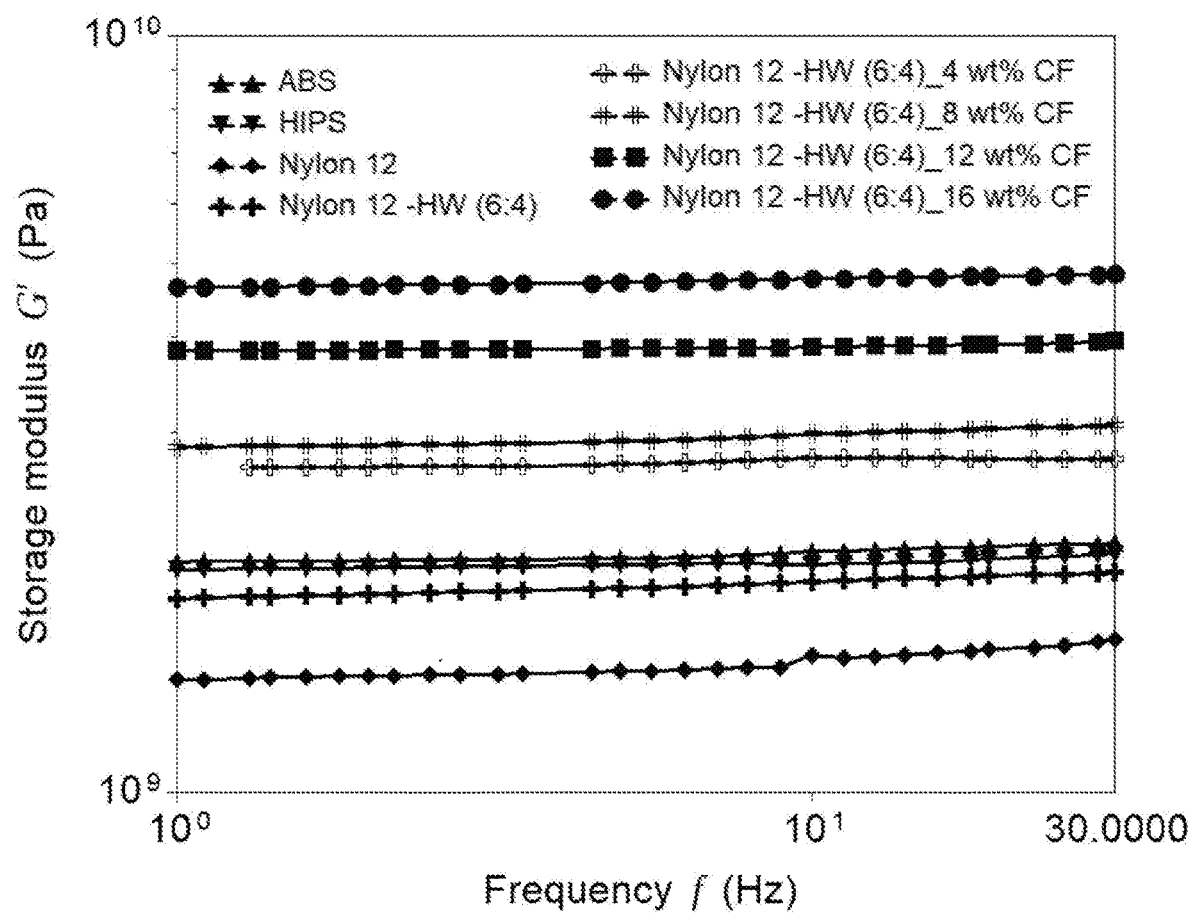
FIGS. 2A-2C are graphs showing the mechanical properties of lignin-based composites.
Figure 2B:
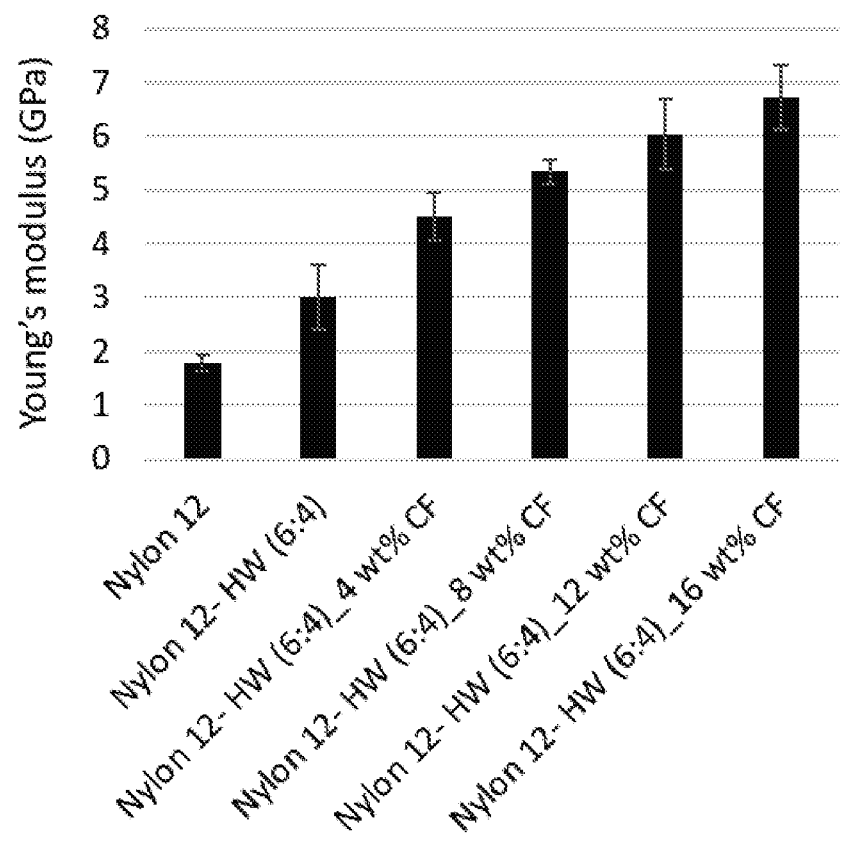
Figure 2C:
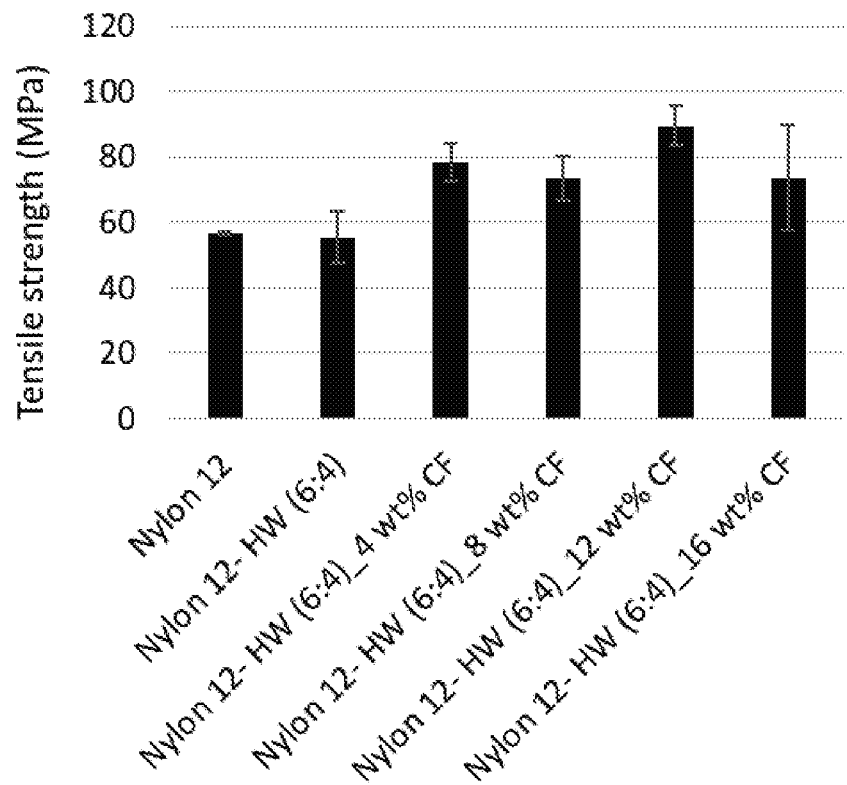

To enhance the stiffness of the material further and to facilitate uninterrupted high-speed feeding of filaments, chopped CFs were incorporated into the nylon 12/HW lignin blends. Utilization of CFs in the lignin-modified nylon matrix improves the mechanical properties of the material without affecting 3D printability. For example, lignin-modified nylon composites containing up to 16 wt % CF exhibit viscosities at high shear rates that are lower than that of the neat nylon matrix (e.g., FIG. 1E). At high frequency, above 10 rad/s, the viscosity of these composites is considerably lower than that of the reference filament, HIPS. For example, at 100 rad/s, the viscosities of lignin (40 wt %)-loaded nylon 12 melt containing 4, 8, 12, and 16 wt % CF are 266, 420, 442, and 630 Pa·s, respectively. All of these composite samples reveal good shear-thinning characteristics, and the flow curves fall within the printability window. Moreover, the data demonstrate the effect of CFs on the improvement of mechanical performance of the lignin-based nylon 12 composites. For example, a 12 wt % CF containing polymer matrix made of nylon 12/HW lignin (6:4) alloy shows >80 MPa tensile strength and ca. 6 GPa tensile modulus. In addition, the three-point bending storage moduli (G') dramatically increased with the incorporation of lignin and CFs to the pristine nylon 12 as shown in FIG. 2A. For example, G' of pristine nylon 12 at 25° C. and 30 Hz is ca. 1.59 GPa. Under identical conditions, the alloy of nylon 12 with 40 wt % HW lignin exhibited a modulus of ca. 1.96 GPa. However, by adding only 4 wt % CF and 16 wt % CF in the nylon 12/HW alloy, the modulus increased to ca. 2.76 GPa (increasing ~41%) and 4.84 GPa (increasing ~147%), respectively. The results of the room temperature tensile Young's moduli and tensile strength of the composites are shown is FIGS. 2B and 2C. The room temperature stiffness requirements for material feeding at high speed was met by incorporating CF in the lignin loaded nylon 12 matrix. High speed feeding of materials not only increase the materials throughput but also increase the shear rate of melt extrusion through die. This increased shear rate further reduces the viscosity (due to shear-thinning nature of the melt), thereby facilitating printability.

The SEM images reveal good dispersion of CFs within the polymer matrix. The formation of spherical aggregated lignin phases within the nylon 12 matrix in the presence of CFs was also observed. The increase in material stiffness without dramatic increase in viscosity profile by the addition of CF facilitates increased feeding speed during the printing process of nylon 12 renewable composites.

Rapid melting of the polymer is critical for maintaining steady-state filament feeding and extrusion rates through the 3D-printing nozzle. Therefore, efficient heat transfer from the heating gun's wall to the bulk filament is needed. This is achieved by loading CFs into the filament, which reduces the radial temperature gradient. Thermoplastic polymers have a very low thermal conductivity. Therefore, the heat transfer from the wall of the heating gun to the center of the loaded filament is slow. The measured thermal conductivity of nylon 12 and nylon 12 containing 40 wt % HW lignin samples was found to be almost identical at a broad temperature ranging from 50° to 100° C. For example, the thermal conductivity at 100° C. of nylon 12 and its composite with 40 wt % HW lignin is 0.2181±0.0025 W/m·K and 0.2154±0.0017 W/m·K, respectively. The addition of CFs into the lignin-loaded nylon causes a temperature-dependent thermal conductivity trend. With higher CF contents of 12 and 16 wt % fiber loading, the thermal conductivity of the composite increases to 0.2331±0.0006 W/m·K (10% increase) and to 0.2551±0.0004 W/m·K (24% increase), respectively. The enhancement of thermal conductivity at high temperatures increases the heat transfer from the heating gun to the material and reduces the phase transition time from solid to liquid (or melt). In addition, after extruding and stacking layers of the printed molten material, the material solidifies faster and fixes the 3D shape quickly without deformation when thermal conductivity of the material is high (i.e., rapid heat dissipation rate). The presence of fiber reinforcement resists deformation due to the shrinkage force experienced by relaxation of the oriented molecules that are rapidly laid through a small nozzle. Thus, the presence of fibers is expected to enhance dimensional stability during printing of composite materials.

The printed objects using the lignin-modified nylon 12 material exhibit good performance, comparable to a standard HIPS commercial filament. Two selected lignin-based composites were used to prepare dog-bone samples for mechanical performance analysis. The measured tensile data of the 3D-printed, lignin-modified nylon and its fiber-reinforced composite samples indicate equivalent mechanical stiffness to that of the corresponding compression-molded samples. For example, the tensile Young's moduli of molded nylon 12/HW lignin (40 wt %) with 4 wt % CFs and the corresponding printed bar are 4.52±0.45 GPa and 4.49±0.74 GPa, respectively. The low melt viscosities of these samples allow for good diffusion at the interface of printed layers, thus leading to elimination of porosity in the printed mass. Like common printed objects made from viscous melts of commodity polymers, the printed HIPS sample cross section exhibits the presence of pores between layers. High resistance to flow of HIPS prevents molecular diffusion at the interface of printed layers.

In summary, the rheological properties of two lignins (an organosolv fractionated HW lignin and a Kraft SW lignin) were measured and correlated to their molecular architectures. The dominance of β-O-4' linkages, aliphatic segments, aliphatic ether groups, and oxygenated aromatic carbons in sinapyl alcohol-rich HW lignin offers good thermal processing characteristics. In contrast, Kraft SW lignin has significant amounts of stiff segments consisting of radically coupled biphenyl and biphenyl ethers based on G and H units, and this leads to it having a high softening point and higher viscosity.

A viscosity window of ca. 70 to 500 Pa·s has been successfully identified for good printability via melt extrusion-based 3D printing of lignin-based materials. The characteristics of different HW lignin compositions analogous to the most common polymer 3D-printing materials, ABS and nylon, were compared to evaluate their printability. Nylon was modified by simply blending it with lignin, and the blends demonstrated promising properties for 3D printability. This permitted lignin to be used as a renewable feedstock to develop green materials for 3D-printing applications. HW lignin reinforced the thermoplastic matrix (nylon 12) at room temperature, increasing the stiffness of the mixture, yet also reducing its melt viscosity, leading to outstanding 3D printability. These characteristics were likely due to the formation of phase-separated lignin domains having good thermoreversible hydrogen-bonding interactions with the matrix. The addition of CFs increased the temperature-dependent thermal conductivity of the renewable 3D-printing materials. Improved thermal conductivity of these new environmentally friendly 3D-printing material adds potential tunability of heat transfer via CF concentration and fiber alignment. In addition, the presence of CFs increased the material's stiffness and strength, thus dramatically improving the material throughput rate. For example, the presence of only 12 wt % CF in nylon 12/HW lignin (6:4) resulted in significantly higher tensile strength (over 80 MPa) and tensile modulus (ca. 6 GPa), over three times higher than the tensile modulus of nylon 12 (ca. 1.77 GPa). Alignment of high aspect ratio fillers by the printing flow indicates a feasible technique to develop printed objects having anisotropic properties for specific applications, such as unidirectional heat transfer and directionally reinforced structures.

Microscale dispersion of spherical HW-lignin particles within the nylon 12 matrix showed an increase in the particle size with increasing lignin content. The presence of two characteristic length scales between the aggregated lignin domains was identified by SANS in combination with scanning electron microscopy. The low melt viscosity of these dispersed HW-lignin particles improves the flow characteristics of nylon 12. Further disintegration of these particle clusters may improve the material's performance. Moreover, the presence of CFs and lignin led to a significant decrease in the melting temperature and recrystallization temperature of nylon 12, which leads to low-melting imperfect crystals. For example, a decrease of about 40° C. in recrystallization temperature of nylon 12 occurred in the composite having 60 wt % HW lignin. Low melting and recrystallization temperatures offer better printability at a lower temperature without degrading the lignin. In addition, reducing the viscosity within the composites allows for excellent interlayer fusion in high-performance printed objects.

The current market for materials used in the melt extrusion-based printing technique is immense. However, petroleum-based thermoplastics currently dominate this market. The market for plant-based materials used in 3D-printing technology is limited because of their inherent difficulties in melt processing. The present invention opens a new avenue of using isolated lignin as a feedstock for formulating 3D-printing materials having superior mechanical and printing characteristics. These findings have the potential to create additional revenue streams for biomass processing industries via the added value of lignin. In addition, the present invention can accelerate installation of pilot biomass fractionation units in rural areas before feeding the whole biomass to a biorefinery. The invention can also boost local polymer compounding industries that manufacture or compound materials for 3D printing and injection molding.

While there have been shown and described what are at present considered the preferred embodiments of the invention, those skilled in the art may make various changes and modifications which remain within the scope of the invention defined by the appended claims.

What is claimed is:

1. A polymer blend material comprising:
   (i) unmodified lignin; and
   (ii) a polyamide having a melting point of no more than 240° C. and which is below the decomposition temperature of the unmodified lignin;
   wherein said polyamide functions as a matrix in which the unmodified lignin is homogeneously dispersed as lignin domains having a size greater than 100 nm and up to 10 microns.

2. The polymer blend material of claim 1, wherein the unmodified lignin is present in an amount of 10-60 wt % by weight of the polymer blend material.

3. The polymer blend material of claim 1, wherein the unmodified lignin is present in an amount of 40-60 wt % by weight of the polymer blend material.

4. The polymer blend material of claim 1, wherein said polyamide is amorphous or semi-crystalline.

5. The polymer blend material of claim 1, wherein said polyamide is aliphatic.

6. The polymer blend material of claim 1, wherein said polyamide is nylon 6, nylon 11, nylon 12, or a plasticized or modified nylon 6,6 that melts below 240° C.

7. The polymer blend material of claim 1, wherein the polymer blend material further includes an elastomer in an amount of 1-30 wt % by weight of the polymer blend material.

8. The polymer blend material of claim 7, wherein said elastomer is nitrile butadiene rubber.

9. The polymer blend material of claim 1, wherein the polymer blend material excludes nitrile butadiene rubber.

10. The polymer blend material of claim 1, wherein the lignin domains have a size greater than 100 nm and up to 5 microns.

11. The polymer blend material of claim 1, wherein the lignin domains have a size of 200 nm to 10 microns.

12. A method of producing an object made of a lignin-containing polymer blend material by melt extrusion, the method comprising:
   (a) melt blending the following components: (i) an unmodified lignin and (ii) a polyamide having a melting point of no more than 240° C. and which is below the decomposition temperature of the unmodified lignin, to form said polymer blend material in which components (i) and (ii) are homogeneously blended and wherein said polyamide functions as a matrix in which the unmodified lignin is homogeneously dispersed as lignin domains having a size greater than 100 nm and up to 10 microns, wherein the polymer blend material exhibits a melt viscosity of no more than 2000 Pa·s at a shear rate of $100\text{-}1000$ $s^{-1}$ and when heated to a temperature of no more than 240° C.; and
   (b) forming an object made of said polymer blend material.

13. The method of claim 12, wherein step (b) employs an extrusion process to form said object.

14. The method of claim 13, wherein said extrusion process occurs in a heating chamber containing a nozzle, and pressure is induced on a melt of the polymer blend material while the polymer blend material is in said heating chamber to adjust the flow rate of the melt through the nozzle to result in the melt having a melt viscosity of no more than 2000 Pa·s.

15. The method of claim 14, wherein said heating chamber is connected to a piston that induces pressure on the melt of the polymer blend material as the piston pushes the melt through the nozzle.

16. The method of claim 14, wherein pressure is induced on the melt of the polymer blend material by exerting pressure on a solid filament of the polymer blend material as the solid filament is being fed into said heating chamber, wherein the pressure pushes the solid filament into the heating chamber at a desired flow rate.

17. The method of claim 13, wherein said extrusion process occurs in an additive manufacturing process.

18. The method of claim 12, wherein step (b) employs a casting process in which a melt of the polymer blend material is casted in a mold.

19. The method of claim 18, wherein said casting process is an injection molding process.

20. The method of claim 19, wherein said injection molding process is a resin transfer molding process.

21. The method of claim 18, wherein said casting process is a compression molding process.

22. The method of claim 12, wherein the unmodified lignin is present in an amount of 10-60 wt % by weight of the polymer blend material.

23. The method of claim 12, wherein the unmodified lignin is present in an amount of 40-60 wt % by weight of the polymer blend material.

24. The method of claim 12, wherein said polyamide is amorphous or semi-crystalline.

25. The method of claim 12, wherein said polyamide is aliphatic.

26. The method of claim 25, wherein said polyamide is nylon 6, nylon 11, nylon 12, or a plasticized or modified nylon 6,6 that melts below 240° C.

27. The method of claim 12, wherein the polymer blend material further includes an elastomer in an amount of no more than 30 wt % by weight of the polymer blend material.

28. The method of claim 27, wherein said elastomer is nitrile butadiene rubber.

29. The method of claim 12, wherein the polymer blend material excludes nitrile butadiene rubber.

* * * * *